(12) United States Patent
Goller et al.

(10) Patent No.: US 9,490,903 B2
(45) Date of Patent: Nov. 8, 2016

(54) HIGH SPEED INFORMATION TRANSFER METHOD AND SYSTEM

(71) Applicants: Stuart E. Goller, Cincinnati, OH (US); Michael D. Goller, Cincinnati, OH (US)

(72) Inventors: Stuart E. Goller, Cincinnati, OH (US); Michael D. Goller, Cincinnati, OH (US)

(*) Notice: Subject to any disclaimer, the term of this patent is extended or adjusted under 35 U.S.C. 154(b) by 0 days.

(21) Appl. No.: 14/729,690

(22) Filed: Jun. 3, 2015

(65) Prior Publication Data
US 2015/0270903 A1 Sep. 24, 2015

Related U.S. Application Data

(62) Division of application No. 13/354,996, filed on Jan. 20, 2012, now Pat. No. 9,077,604.

(60) Provisional application No. 61/434,640, filed on Jan. 20, 2011.

(51) Int. Cl.
*H04B 10/516* (2013.01)
*H04L 27/28* (2006.01)
*H04L 27/32* (2006.01)

(52) U.S. Cl.
CPC .......... *H04B 10/516* (2013.01); *H04L 27/28* (2013.01); *H04L 27/32* (2013.01)

(58) Field of Classification Search
CPC .................................................. H04B 10/516
USPC ................. 375/260, 259, 261, 284, 296
See application file for complete search history.

(56) References Cited

U.S. PATENT DOCUMENTS

| | | |
|---|---|---|
| 2,064,896 A | 12/1936 | Espenschied et al. |
| 2,889,549 A | 6/1959 | Caughey |
| 3,247,497 A | 4/1966 | Lee |
| 3,388,392 A | 6/1968 | Fisher et al. |
| 3,696,403 A | 10/1972 | DiRocco |
| 3,725,904 A | 4/1973 | Breslow et al. |
| 3,986,020 A | 10/1976 | Kogelnik |
| 4,078,232 A | 3/1978 | Balkanli |
| 4,232,385 A | 11/1980 | Hara et al. |
| 4,516,086 A | 5/1985 | Boudault |
| 4,530,084 A | 7/1985 | Strebel et al. |
| 4,745,592 A | 5/1988 | Gabriagues |
| 4,851,842 A | 7/1989 | Iwamatsu |
| 5,384,651 A | 1/1995 | Van de Voorde et al. |
| 5,504,699 A | 4/1996 | Goller et al. |
| 5,745,409 A | 4/1998 | Wong et al. |
| 6,122,010 A | 9/2000 | Emelko |
| 6,556,326 B2 | 4/2003 | Bergano |
| 6,870,836 B1 | 3/2005 | Dyke et al. |
| 7,092,641 B2 | 8/2006 | Windover |
| 7,110,730 B2 | 9/2006 | Okada et al. |
| 7,257,142 B2 | 8/2007 | Sochava |
| 7,376,554 B2 | 5/2008 | Ojala et al. |
| 7,594,010 B2 * | 9/2009 | Dohler .......... H04B 7/2606 370/328 |
| 7,715,453 B2 | 5/2010 | Gollier |
| 7,907,648 B2 | 3/2011 | Matsui et al. |
| 7,978,976 B2 | 7/2011 | Pohjola et al. |
| 8,078,061 B2 | 12/2011 | Lee et al. |
| 8,909,278 B2 * | 12/2014 | Rao .............. H04W 52/225 370/252 |
| 9,077,604 B2 | 7/2015 | Goller et al. |

(Continued)

*Primary Examiner* — Qutbuddin Ghulamali
(74) *Attorney, Agent, or Firm* — Frost Brown Todd LLC

(57) ABSTRACT

A high speed information transfer method and system that encode volumes of information into electromagnetic radiation, successfully transmits the electromagnetic radiation and decodes the electromagnetic radiation back into information.

24 Claims, 17 Drawing Sheets

(56) References Cited

U.S. PATENT DOCUMENTS

| | | | | |
|---|---|---|---|---|
| 2003/0072051 A1* | 4/2003 | Myers | ............. | H04J 14/002 398/43 |
| 2004/0208240 A1* | 10/2004 | Kilbank | ............. | H03M 7/30 375/222 |
| 2005/0065783 A1* | 3/2005 | Ojala | ............. | G10L 21/038 704/205 |
| 2007/0025421 A1* | 2/2007 | Shattil | ............. | H04B 10/25752 375/136 |
| 2010/0241493 A1* | 9/2010 | Onischuk | ............. | G07C 13/00 705/12 |

* cited by examiner

| FREQUENCIES | AMPLITUDE A 420 | AMPLITUDE A + 1 421 | AMPLITUDE A + 2 422 | AMPLITUDE A + 3 423 | AMPLITUDE A + 4 424 |
|---|---|---|---|---|---|
| 400 → f₁ | A ← 431 | B ← 444 | C ← 457 | D ← 470 | E ← 483 |
| 401 → f₂ | a ← 432 | и ← 445 | с ← 458 | в ← 471 | y ← 484 |
| 402 → f₃ | א ← 433 | ב ← 446 | ג ← 459 | ת ← 472 | n ← 485 |
| 403 → f₄ | 春 ← 434 | 井 ← 447 | 井 ← 460 | 名 ← 473 | 米 ← 486 |
| 404 → f₅ | U ← 435 | Y ← 448 | Γ ← 461 | 1 ← 474 | . ← 487 |
| 405 → f₆ | 1 ← 436 | 2 ← 449 | 3 ← 462 | 4 ← 475 | 5 ← 488 |
| 406 → f₇ | ; ← 437 | ; ← 450 | \ ← 463 | $ ← 476 | ~ ← 489 |
| 407 → f₈ | pizza ← 438 | book ← 451 | sky ← 464 | fire gun ← 477 | richard ← 490 |
| 408 → f₉ | This is ← 439 | Good morning, siri ← 452 | A phrase ← 465 | start game ← 478 | nt ← 491 |
| 409 → f₁₀ | Democracy ← 440 | love ← 453 | freedom ← 466 | stop game ← 479 | beauty ← 492 |
| 410 → f₁₁ | cincinnati ← 441 | chicago ← 454 | detroit ← 467 | click ← 480 | double click ← 493 |
| 411 → f₁₂ | 45 deg ← 442 | 12 deg ← 455 | 17 deg ← 468 | 12.5 deg ← 481 | 271.8 deg ← 494 |
| 412 → f₁₃ | ← 443 | 赤 ← 456 | northeast ← 469 | a quantum state ← 482 | X + 1/y ← 495 |

HIGH SPEED INFORMATION TRANSFER METHOD AND SYSTEM

PRIORITY

This application is a divisional of and claims priority to U.S. patent application Ser. No. 13/354,996, filed Jan. 20, 2012, entitled "HIGH SPEED INFORMATION TRANSFER METHOD AND SYSTEM," which issued as U.S. Pat. No. 9,077,604 on Jul. 7, 2015, which itself claims priority to U.S. Provisional Patent Application Ser. No. 61/434,640, filed Jan. 20, 2011, also entitled "HIGH SPEED INFORMATION TRANSFER METHOD AND SYSTEM," the disclosure of each of which is incorporated by reference herein.

FIELD OF INVENTION

The present invention relates generally to the field of high speed information transfer, and more specifically with using a encoding table to convert information to electromagnetic radiation, transmitting the electromagnetic radiation, receiving the electromagnetic radiation, using a encoding table to decode the electromagnetic radiation back into information.

BACKGROUND OF THE INVENTION

A high speed information transfer method and system. Information transfer methods have developed from ancient times to modern systems. Information is currently being generated in increasingly huge volumes. Current optical and other information transmission methods are successful but coming under pressure due to the growth of information volume and the demand of users for faster more efficient methods and systems for transferring information. Digital transmission of information requires information to be digitized into combinations of at least 8 bits. Transmitting information as bits requires substantial bandwidth. This problem is exacerbated when attempting to digitize double byte character sets (DBCS) which include national language character sets for Chinese, Japanese, and Korean.

As an example, there may be a clear benefit if a user can encode volumes of information into electromagnetic radiation, successfully transmit the electromagnetic radiation and decode the electromagnetic radiation back into information.

SUMMARY OF THE INVENTION

A high speed information transfer method and system.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 12 illustrates an exemplary encoding table demonstrating encoding information to frequencies and amplitudes of electromagnetic radiation wave, consistent with the present invention;

DETAILED DESCRIPTION

The present invention described below illustrates a high speed information transfer method and system. The following detailed description of the invention refers to the accompanying drawings. The same reference numbers in different drawings identify the same or similar elements. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention. Also the following detailed description does not limit the invention. Instead, the scope of the invention is defined by the appended claims.

Exemplary Network

Figure 1:
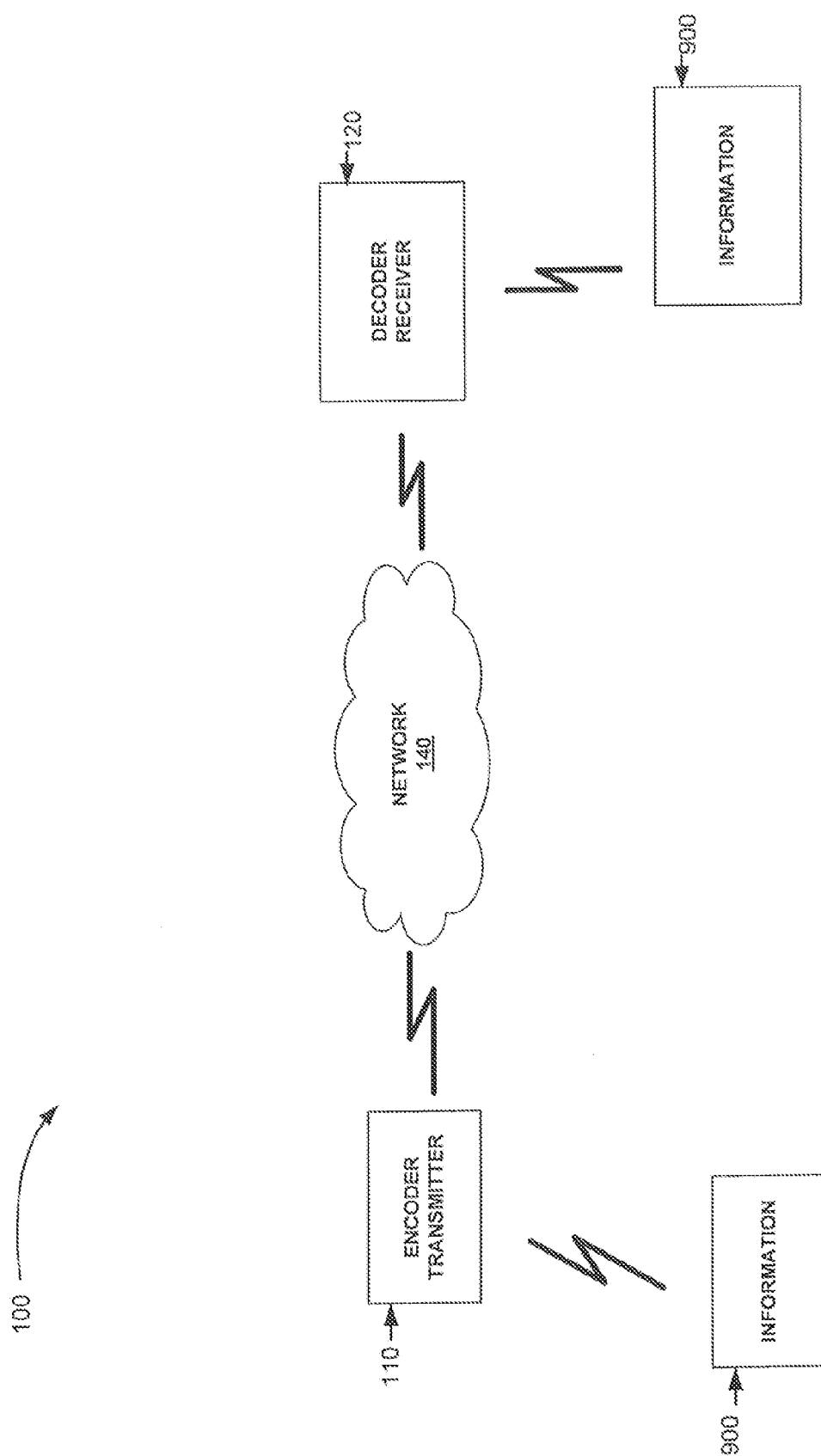
FIG. 1 illustrates an exemplary network in which a system and method, consistent with the present invention may be implemented.

FIG. 1 illustrates an exemplary network 100 in which a system and method, consistent with the present invention, may be implemented. The network 100 may include an encoder transmitter 110 connected to a decoder receiver 120 via a network 140. Encoder transmitter 110 may communicate to decoder receiver 120. The network 140 may include a local area network (LAN), wide area network (WAN), telephone network such as the Public Switched Telephone Network (PSTN), satellite network, wireless network, optical network, mobile phone network, intranet, Internet, open space network, electromagnetic wave network, or a combination of networks. One encoder transmitter 110 and one decoder receiver 120 have been illustrated as connected to network 140 for simplicity. In practice, there may be more encoder transmitters 110 and decoder receivers 120.

There may be more than one network 140. Each network 140 may be separate from other networks 140. In another implementation of the current invention, a network 140 may connect to and be able to transmit signals to and receive signals from one or more additional networks 140.

The encoder transmitter 110 may include devices, such as computers, mainframes, minicomputers, personal computers, laptops, tablets, personal digital assistants, telephones, console gaming devices, mobile gaming devices, set top boxes, TV, home appliance, industrial equipment, mobile phones, fiber optic system, open space transmission system, multiplexer, electromagnetic wave transmission system or the like, capable of connecting to the network 140. The encoder transmitter 110 may transmit information 900 over the network 140.

The decoder receiver 120 may include devices, such as computers, mainframes, minicomputers, personal computers, laptops, tablets, personal digital assistants, telephones, console gaming devices, mobile gaming devices, set top boxes, TV, home appliance, industrial equipment, mobile phones, fiber optic system, open space transmission system, de-multiplexer, electromagnetic wave transmission system or the like, capable of connecting to the network 140. The decoder receiver 120 may receive information 900 over the network 140.

In alternative implementations, one or more encoder transmitter 110 may include mechanisms for directly connecting to one or more decoder receivers 120.

Figure 2:
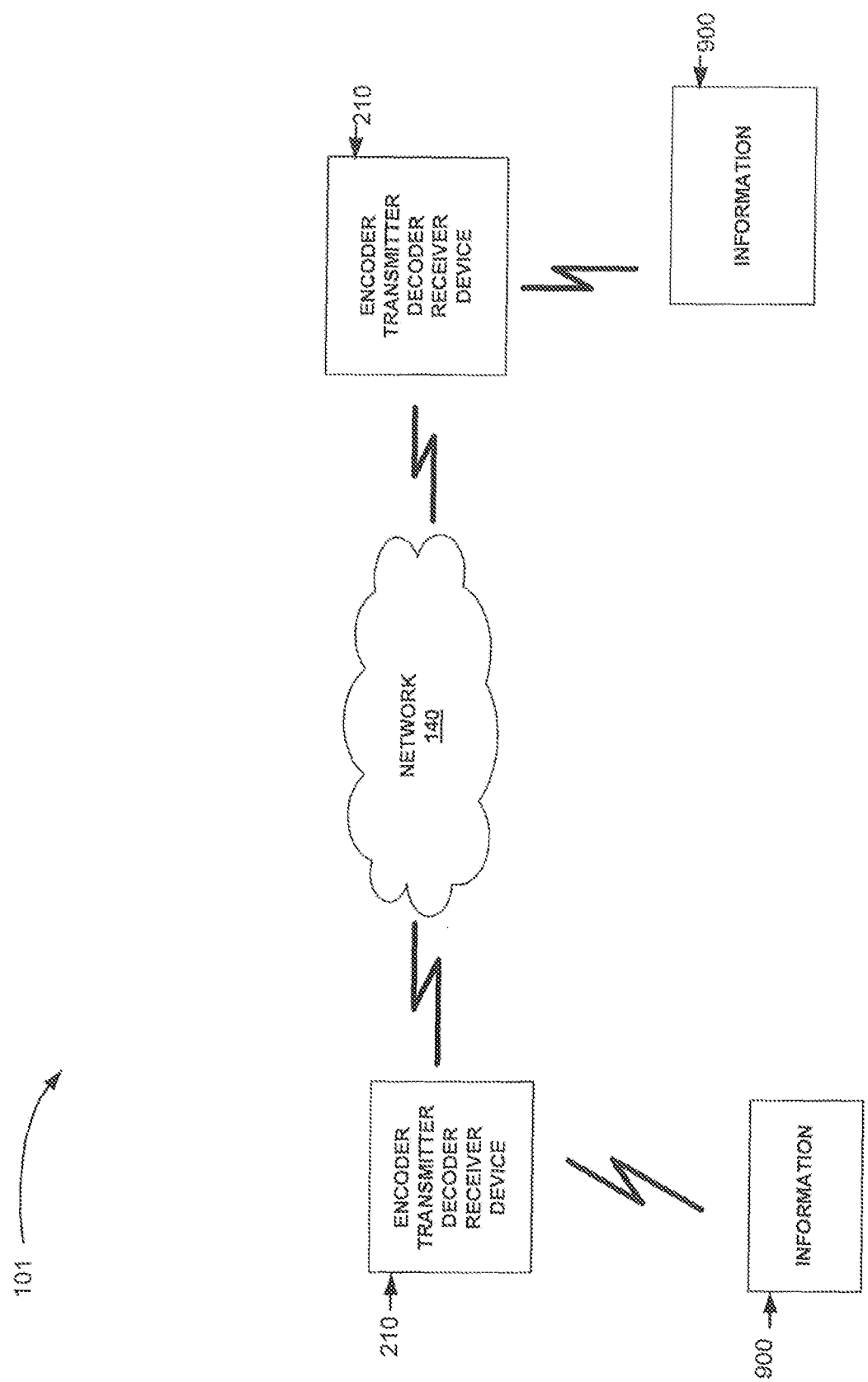
FIG. 2 illustrates an alternative exemplary network in which a system and method, consistent with the present invention may be implemented.

FIG. 2 illustrates an exemplary alternate network 102 in which a system and method, consistent with the present invention, may be implemented. A alternate network 102 may comprise two encoder transmitter decoder receivers 210 and a network 140. The two encoder transmitter decoder receivers 210 may communicate bi-directionally through network 140. Two encoder transmitter decoder receivers 210 have been illustrated as connected to network 140 for simplicity. In practice, there may be more encoder transmitter decoder receivers 210 connected to network 140.

The encoder transmitter decoder receiver 210 may include devices, such as computers, mainframes, minicomputers, personal computers, laptops, tablets, personal digital assistants, telephones, console gaming devices, mobile gaming devices, set top boxes, TV, home appliance, industrial equipment, mobile phones, fiber optic transmission system, open space transmission system, multiplexer, de-multiplexer, electromagnetic wave transmission system or the like, capable of connecting to the network 140. The encoder transmitter decoder receiver 210 may transmit information 900 over the network 140, or receive information 900 from the network 140. The encoder transmitter decoder receiver 210 may operate similarly to the encoder transmitter 110 and decoder receiver 120 previously described in FIG. 1.

In alternative implementations, the encoder transmitter decoder receiver 210 may include mechanisms for directly connecting to one or more encoder transmitter decoder receivers 210.

Exemplary Encoder Transmitter and Decoder Receiver

Figure 3A:
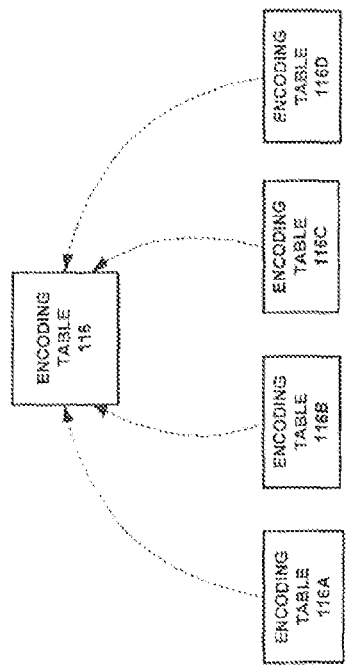
FIG. 3A illustrates exemplary encoding tables, consistent with the present invention.
Figure 3B:
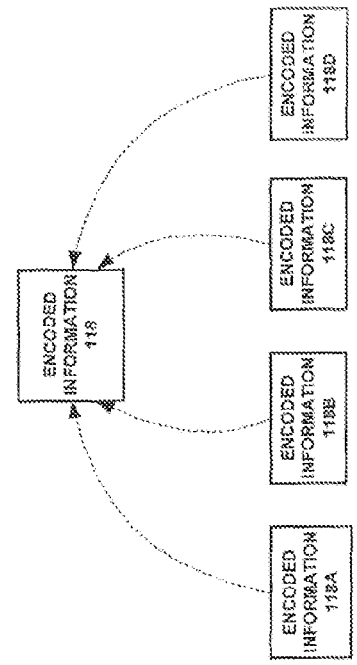
FIG. 3B illustrates exemplary encoded information, consistent with the present invention.
Figure 3:
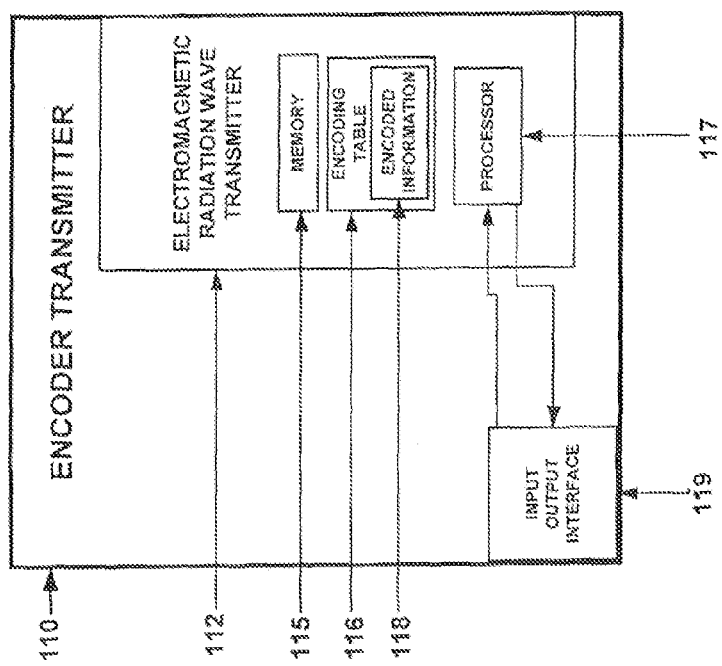
FIG. 3 illustrates an exemplary encoder transmitter, consistent with the present invention.

FIG. 3 illustrates a encoder transmitter 110, consistent with the present invention, which may comprise a electromagnetic radiation wave transmitter 112, and an input output interface 119. Electromagnetic radiation wave transmitter 112 may comprise a memory 115, an encoding table 116, and a processor 117. It will be appreciated, however, that memory 115 may be used to store encoding table 116. Memory 115 may be used by for storing other information and data in encoder transmitter 110.

The encoder transmitter 110 may utilize input output interface 119 to communicate with devices or users outside of this invention through means known to those familiar with the art of input output interface, that will not be discussed here.

FIG. 3A illustrates an encoding table 116. Encoding table 116 may comprise a encoding table 116A, encoding table 116B, encoding table 116C, encoding table 116D, or the like. Encoding table 116 may comprise a combination of encoding tables, that may include one or more of encoding table 116A, encoding table 116B, encoding table 116C, encoding table 116D, or the like. An encoding table 116, 116A, 116B, 116C, 116D, or the like, may comprise encoded information 118.

FIG. 3B illustrates an encoded information 118. Encoded information 118 may comprise encoded information 118A, encoded information 118B, encoded information 118C, encoded information 118D, or the like. Encoded information 118 may comprise a combination of encoded information, that may include one or more of encoded information 118A, encoded information 118B, encoded information 118C, encoded information 118D, or the like.

Figure 3C:
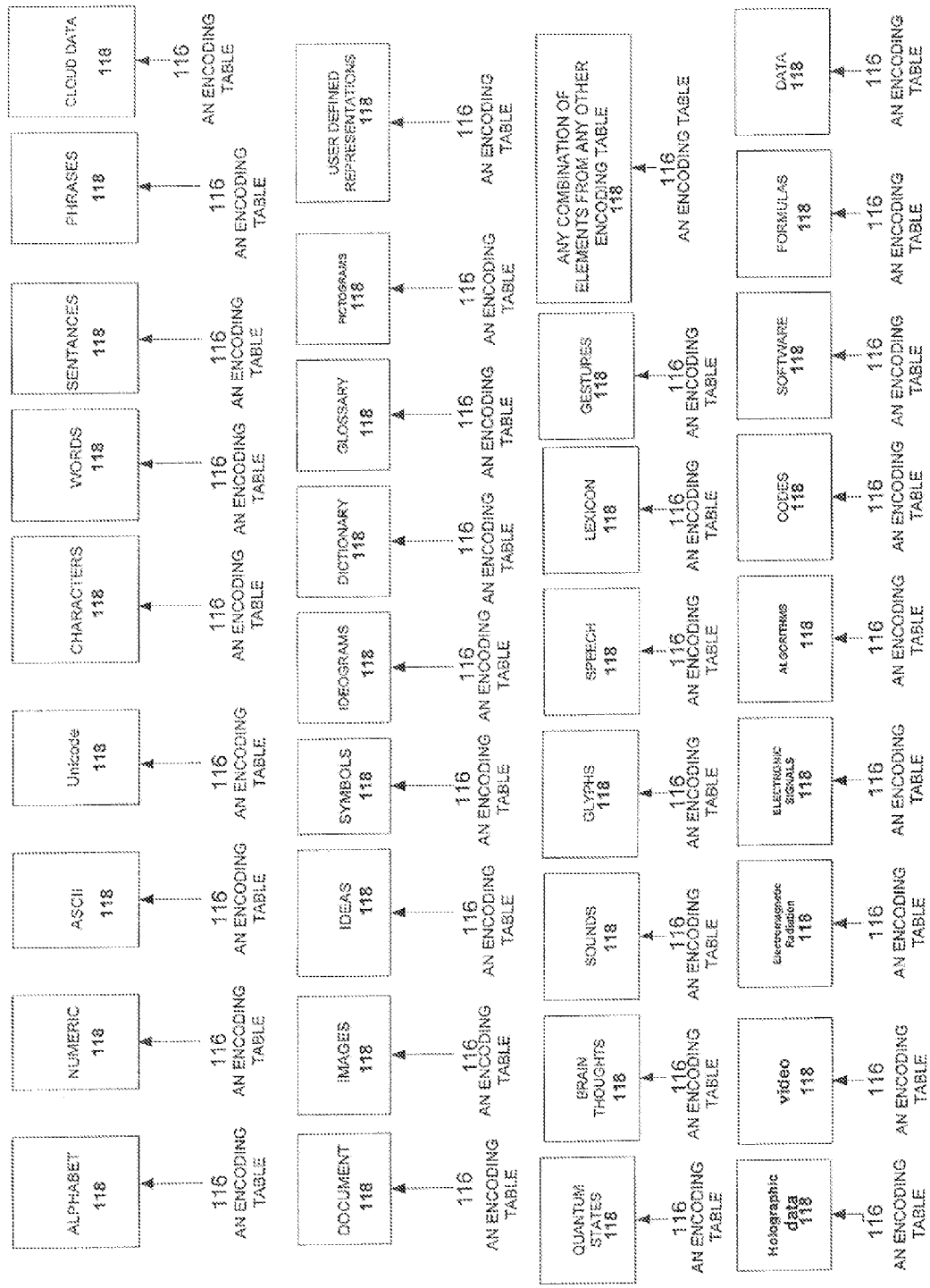
FIG. 3C illustrates exemplary encoding tables and exemplary categories of information that may be included in the encoding tables.

FIG. 3C illustrates exemplary encoding tables 116. Encoding tables 116 may comprise encoded information 118 that may be categorized as demonstrated. FIG. 3C is not meant to limit the types of information in an encoding table 116, but to simple give some examples. For simplicity the words "encoding table" are used to describe encoding table 116, 116A, 116B, 116C, 116D, or the like, but those familiar in the art of data management, which is not discussed here, understand that data may be stored in means other than a table with the same effect as a table. The use of the words "encoding table" are not meant to limit the invention.

Figure 4:
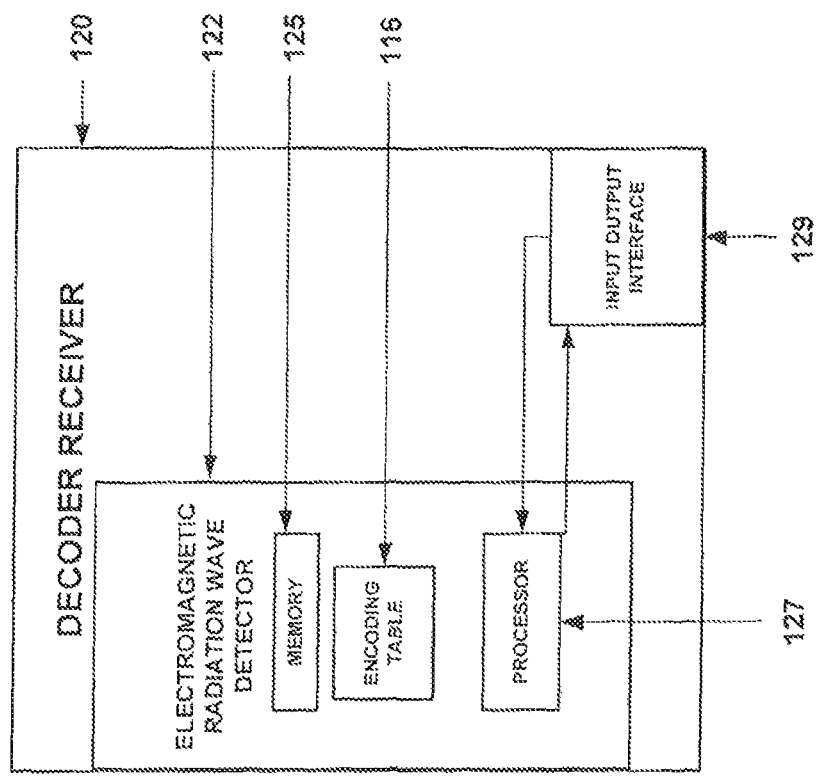
FIG. 4 illustrates an exemplary decoder receiver, consistent with the present invention.

FIG. 4 illustrates a decoder receiver 120, consistent with the present invention, which may comprise a electromagnetic radiation wave detector 122, and an input output interface 129. Electromagnetic radiation wave detector 122 may comprise a memory 125, an encoding table 116, and a processor 127. It will be appreciated, however, that memory 125 may be used to store encoding table 116. Memory 125 may be used for storing other information and data in decoder receiver 120.

The decoder receiver 120 may utilize input output interface 129 to communicate with devices or users outside of this invention through means known to those familiar with the art of input output interface, that will not be discussed here.

Figure 5:
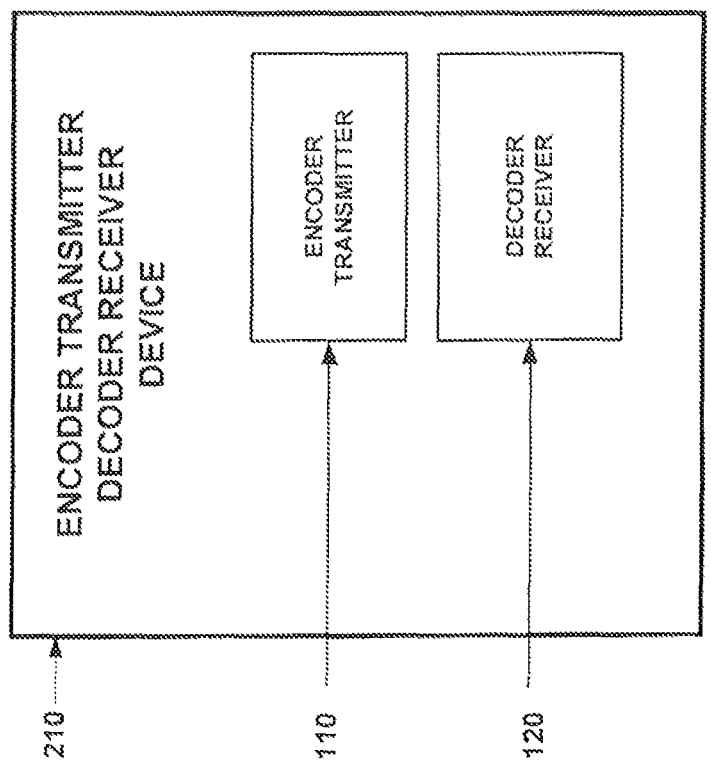
FIG. 5 illustrates an exemplary encoder transmitter decoder receiver device, consistent with the present invention.

FIG. 5 illustrates a encoder transmitter decoder receiver 210, consistent with the present invention, that may comprise a encoder transmitter 110 and a decoder receiver 120 that may allow for bi-directional communications between two or more encoder transmitter decoder receivers 210.

The encoder transmitter decoder receiver 210 may utilize input output interfaces 119 and or 129 as described in FIGS. 3 and 4, to communicate with devices or users outside of this invention through means known to those familiar with the art of input output interface, that will not be discussed here.

Encoder transmitter 110 may have components programmed into it that may be update-able, modify-able, replace-able, retrieve-able, or delete-able.

Decoder receiver 120 may have components programmed into it that may be update-able, modify-able, replace-able, retrieve-able, or delete-able.

Encoder transmitter decoder receiver 210 may have components programmed into it that may be update-able, modify-able, replace-able, retrieve-able, or delete-able.

Figure 6:
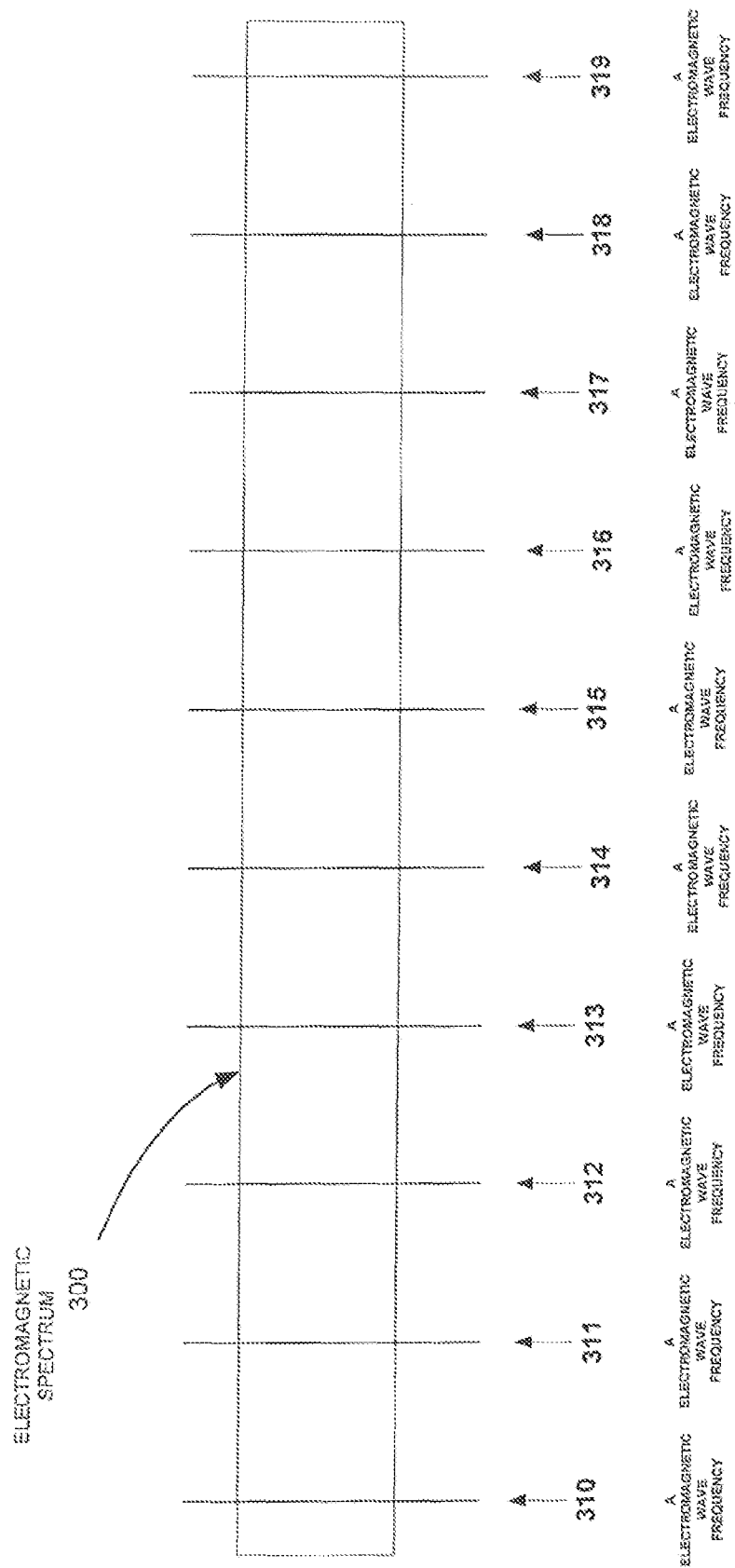
FIG. 6 illustrates an exemplary division of electromagnetic spectrum by frequency, consistent with the present invention.

FIG. 6 illustrates electromagnetic radiation spectrum 300 of a plurality of electromagnetic radiation spectrum. Each electromagnetic radiation wave frequencies 310-319 of a plurality of electromagnetic radiation wave frequencies, may be identified from electromagnetic radiation spectrum 300 through means known to those familiar with the art of electromagnetic radiation spectrum identification and subdivision, that will not be discussed here. Electromagnetic radiation spectrum 300 comprising electromagnetic radiation wave frequencies 310-319 of a plurality of electromagnetic radiation wave frequencies, have been illustrated for simplicity. In practice, there may be more or less electromagnetic radiation wave frequencies 310-319 of a plurality of electromagnetic radiation wave frequencies.

Figure 7:
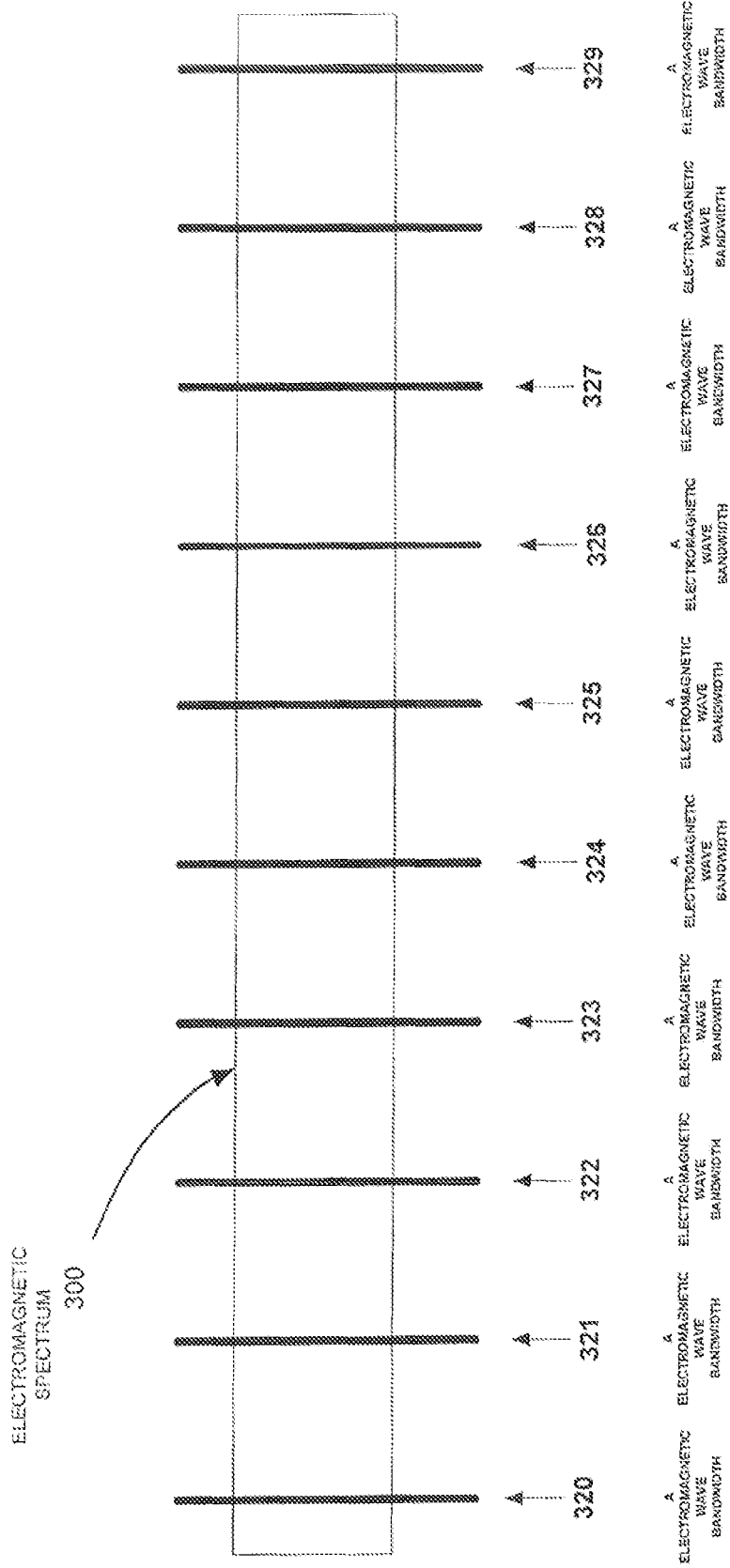
FIG. 7 illustrates an exemplary division of electromagnetic spectrum by bandwidth, consistent with the present invention.

FIG. 7 illustrates an electromagnetic radiation spectrum 300 of a plurality of electromagnetic radiation spectrum. Each electromagnetic radiation wave bandwidth 320-329 of a plurality of electromagnetic radiation wave bandwidths, may be identified from electromagnetic radiation spectrum 300 through means known to those familiar with the art of electromagnetic radiation spectrum identification and subdivision, that will not be discussed here. Electromagnetic radiation spectrum 300 comprising electromagnetic radiation wave bandwidths 320-329 of a plurality of electromagnetic radiation wave bandwidths have been illustrated for simplicity. In practice, there may be more or less electromagnetic radiation wave bandwidths 320-329 of a plurality of electromagnetic radiation wave bandwidths.

Figure 8:
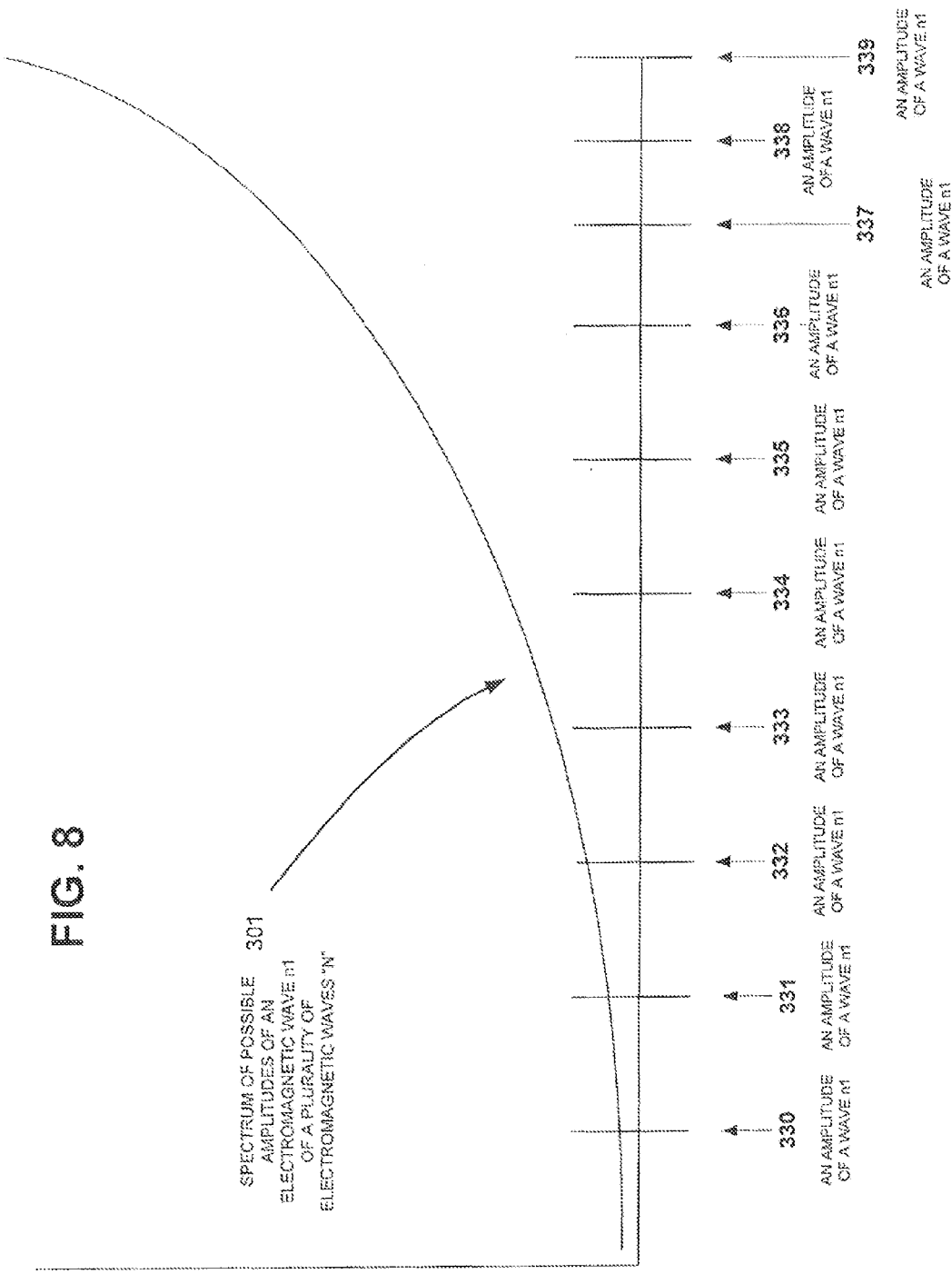
FIG. 8 illustrates an exemplary division of amplitude spectrum of an electromagnetic radiation wave, consistent with the present invention.

FIG. 8 illustrates a spectrum of possible amplitudes of an electromagnetic radiation wave n1 301 of a plurality of electromagnetic radiation waves N. Each discrete amplitude of an electromagnetic radiation wave n1 330-339 of a plurality of discrete amplitudes of an electromagnetic radiation wave n1, may be identified from the spectrum of possible amplitudes of an electromagnetic radiation wave n1 301 through means known to those familiar with the art of electromagnetic radiation wave amplitude identification and subdivision, that will not be discussed here. Spectrum of possible amplitudes of an electromagnetic radiation wave n1 301 comprising discrete amplitude of an electromagnetic radiation wave n1 330-339 of a plurality of discrete amplitudes of an electromagnetic radiation wave n1, have been illustrated for simplicity. In practice, there may be more or less discrete amplitudes of an electromagnetic radiation wave n1 330-339 of a plurality of discrete amplitudes of an electromagnetic radiation wave n1.

Figure 9:
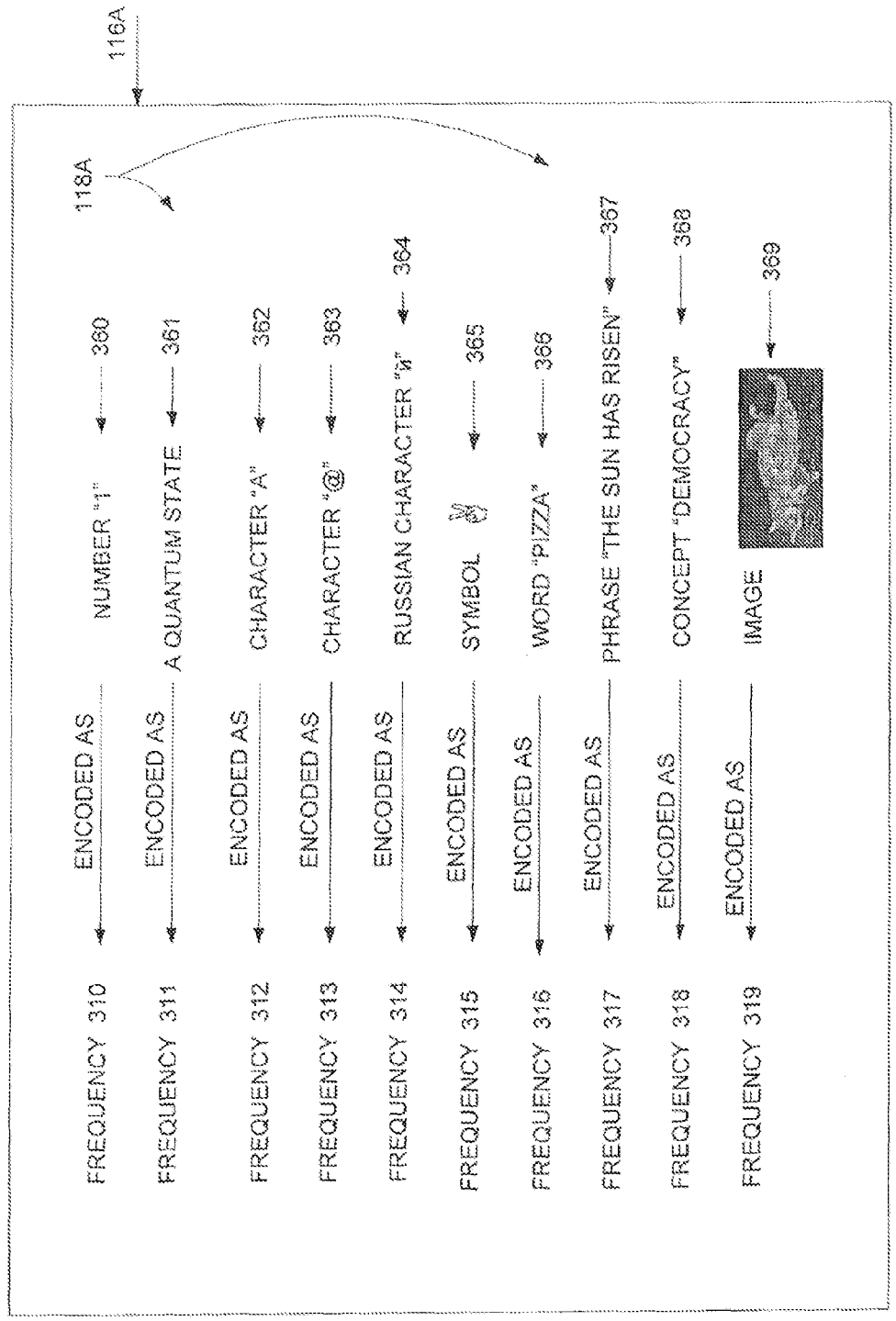
FIG. 9 illustrates an exemplary encoding table demonstrating encoding information to electromagnetic radiation frequencies, consistent with the present invention.

FIG. 9 illustrates an encoding table 116A. Encoding table 116A may comprise a listing of electromagnetic radiation wave frequencies 310-319 of a plurality of electromagnetic radiation wave frequencies, and a listing of encoded information 118A of a plurality of encoded information. Encoded information 118A of a plurality of encoded information may comprise information 360-369 of a plurality of information. Encoded information 118A of a plurality of encoded information, information 360-369 of a plurality of information, may comprise individual characters, combinations of characters, alphabet, numeric, ASCII, UTF, Unicode, dictionary, glossary, lexicon, glyphs, symbols, words, sentences, phrases, ideas, pictographs, pictograms, ideograms, images, sounds, speech, gestures, physical objects, light, electronic signals, thoughts, ideas, algorithms, codes, software, formulas, video, cloud data, holographic data, data or combinations of information. Information 360-369 of a plurality of information, may be associated to electromagnetic radiation wave frequencies 310-319 of a plurality of electromagnetic radiation wave frequencies, on a one to one relationship, as may be demonstrated by the following examples, information 360 the number "1", encoded as frequency 310; information 361 a quantum state, encoded as frequency 311; information 362 the character "A", encoded as frequency 312; information 363 the character "@", encoded as frequency 313; information 364 the Russian character "", encoded as frequency 314; information 365 the symbol "", encoded as frequency 315; information 366 the word "Pizza", encoded as frequency 316; information 367 the phrase "the sun has risen", encoded as frequency 317, information 368 the concept "democracy", encoded as frequency 318, information 369 the image "a cat", encoded as frequency 319.

Encoding table 116A comprising electromagnetic radiation wave frequencies 310-319 of a plurality of electromagnetic radiation wave frequencies, and information 360-369 of a plurality of information, have been illustrated for simplicity. In practice, there may be more or less electromagnetic radiation wave frequencies 310-319 of a plurality of electromagnetic radiation wave frequencies, and information 360-369 of a plurality of information. There may be no limit on how many times information may repeatedly appear as information 360-369 of a plurality of information, in a table 116A. As further example, an alphabet character "M" may appear once or more than once as information in a table 116A, or not at all. In some cases association to a letter "M" by an electromagnetic radiation wave frequency 310-319 of a plurality of electromagnetic radiation wave frequencies, in a table 116A, may occur more than once with each unique letter "M" having a unique electromagnetic radiation wave frequencies 310-319 associated to it.

Figure 10:
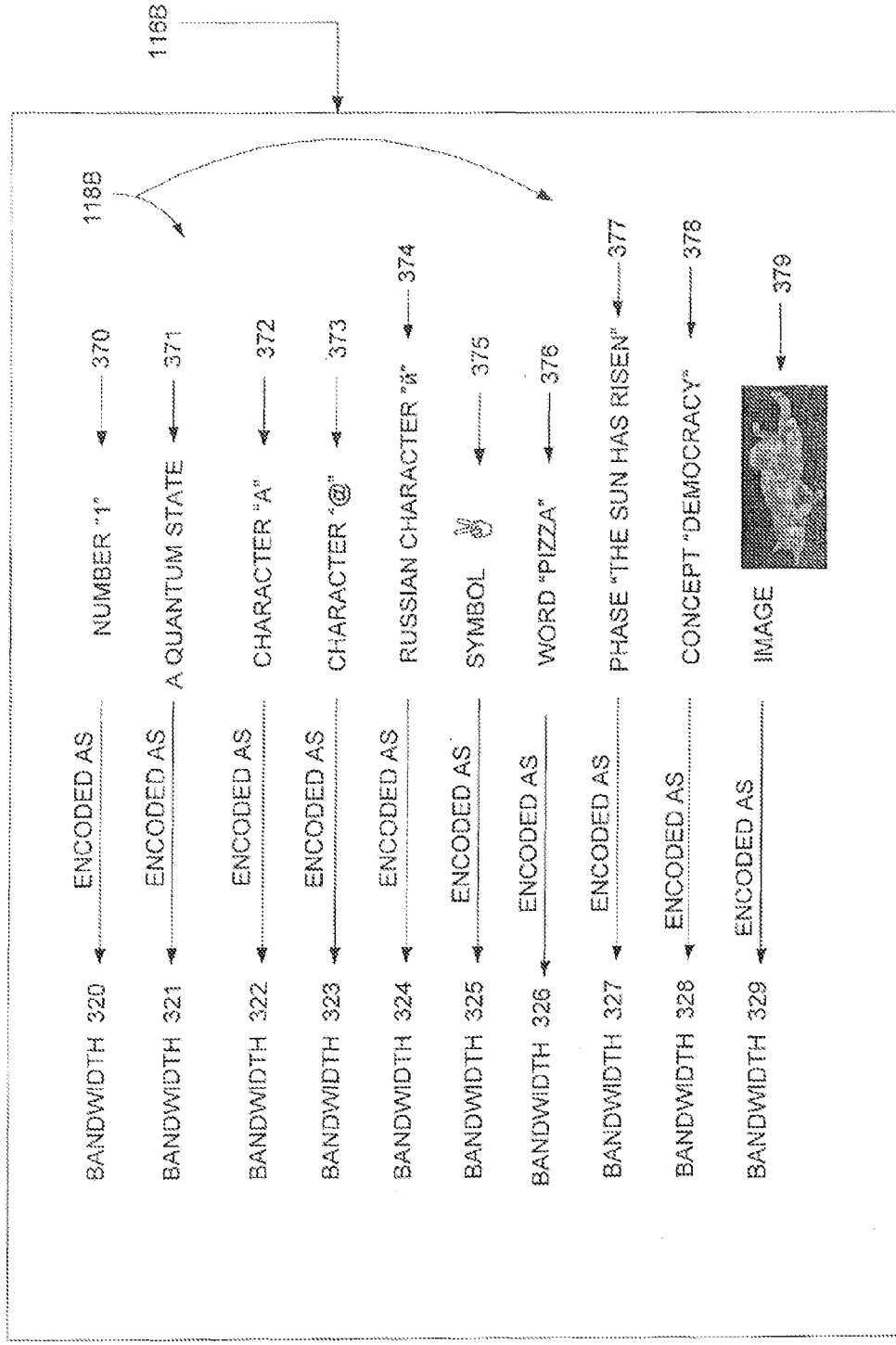
FIG. 10 illustrates an exemplary encoding table demonstrating encoding information to electromagnetic radiation bandwidths, consistent with the present invention.

FIG. 10 illustrates an encoding table 116B. Encoding table 116B may comprise a listing of electromagnetic radiation wave bandwidths 320-329 of a plurality of electromagnetic radiation wave bandwidths and a listing of encoded information 118B of a plurality of encoded information. Encoded information 118B of a plurality of encoded information, may comprise information 370-379 of a plurality of information. Encoded information 118B of a plurality of encoded information, 370-379 of a plurality of information may comprise individual characters, combinations of characters, alphabet, numeric, ASCII, UTF, Unicode, dictionary, glossary, lexicon, glyphs, symbols, words, sentences, phrases, ideas, pictographs, pictograms, ideograms, images, sounds, speech, gestures, physical objects, light, electronic signals, thoughts, ideas, algorithms, codes, software, formulas, video, cloud data, holographic data, data or combinations of information. Information 370-379 of a plurality of information may be associated to electromagnetic radiation wave bandwidths 320-329 of a plurality of electromagnetic radiation wave bandwidths, on a one to one relationship as demonstrated by information 370 the number "1", encoded as bandwidth 320; information 371 a quantum state, encoded as bandwidth 321; information 372 the character "A", encoded as bandwidth 322; information 373 the character "@", encoded as bandwidth 323; information 374 the Russian character "", encoded as bandwidth 324; information 375 the symbol "", encoded as bandwidth 325; information 376 the word "Pizza", encoded as bandwidth 326;

information 377 the phrase "the sun has risen", encoded as bandwidth 327, information 378 the concept "democracy", encoded as bandwidth 328, information 379 the image "a cat", encoded as bandwidth 329.

Encoding table 116B comprising electromagnetic radiation wave bandwidths 320-329 of a plurality of electromagnetic radiation wave bandwidths, and information 370-379 of a plurality of information have been illustrated for simplicity. In practice, there may be more or less electromagnetic radiation wave bandwidths 320-329 of a plurality of electromagnetic radiation wave bandwidths and information 370-379 of a plurality of information. There may be no limit on how many times a unique piece of information may appear as information 370-379 of a plurality of information, in a table 116B. As example an alphabet character "B" may appear once or more than once as information in a table 116B, or not at all. In some cases association to a letter "B" by an electromagnetic radiation wave bandwidth 320-329 of a plurality of electromagnetic radiation wave bandwidths, in a table 116B, may occur more than once with each unique letter "B" having a unique electromagnetic radiation wave bandwidths 320-329 associated to it.

Figure 11:
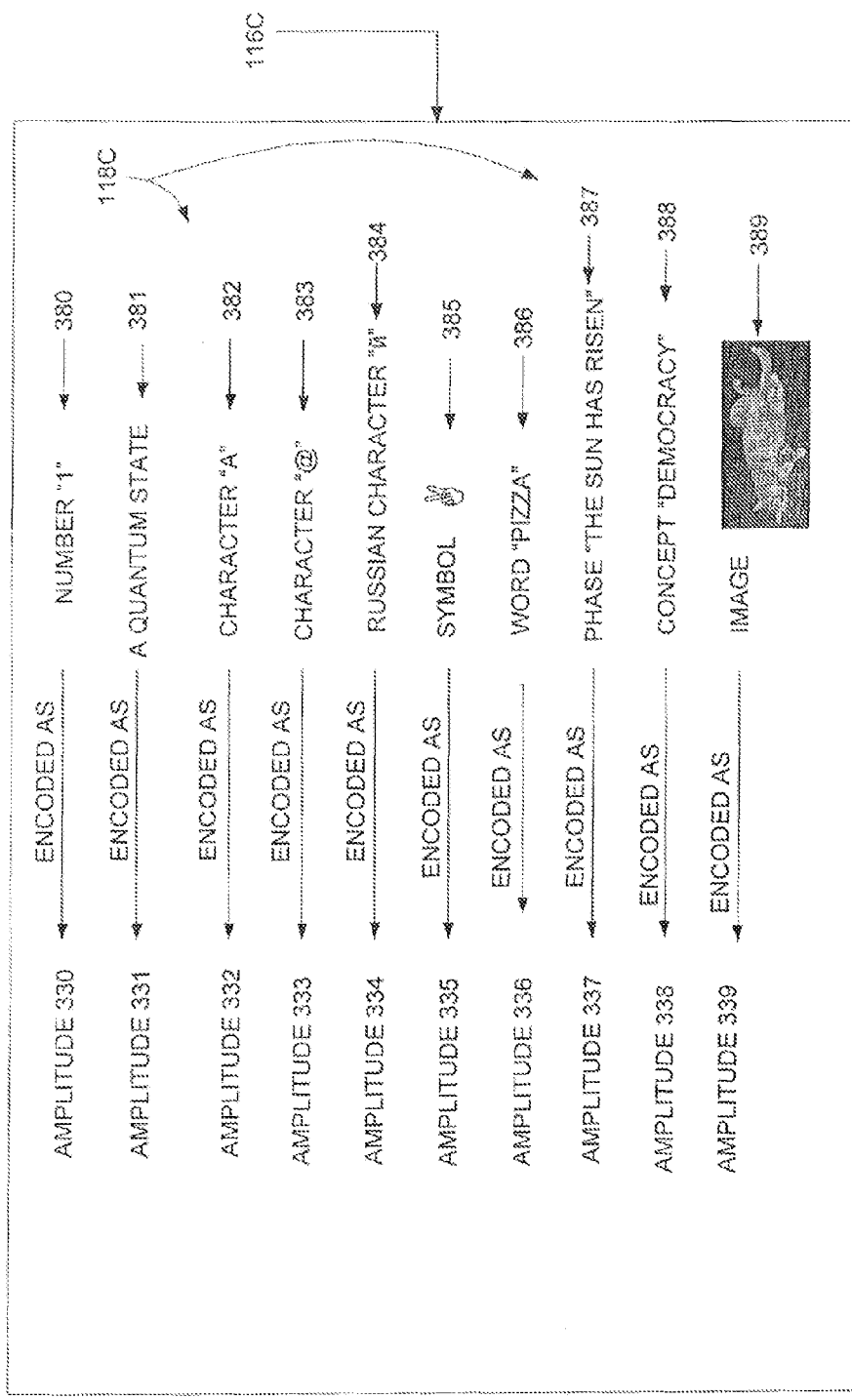
FIG. 11 illustrates an exemplary encoding table demonstrating encoding information to amplitudes of an electromagnetic radiation wave's amplitude, consistent with the present invention.

FIG. 11 illustrates an encoding table 116C. Encoding table 116C may comprise a listing of discrete amplitudes of an electromagnetic radiation wave n1 330-339 of a plurality of discrete amplitudes of an electromagnetic radiation wave n1, and a listing of encoded information 118C of a plurality of encoded information. Encoded information 118C of a plurality of encoded information may comprise information 380-389 of a plurality of information. Encoded information 118C of a plurality of encoded information, information 380-389 of a plurality of information may comprise individual characters, combinations of characters, alphabet, numeric, ASCII, UTF, Unicode, dictionary, glossary, lexicon, glyphs, symbols, words, sentences, phrases, ideas, pictographs, pictograms, ideograms, images, sounds, speech, gestures, physical objects, light, electronic signals, thoughts, ideas, algorithms, codes, software, formulas, video, cloud data, holographic data, data or combinations of information. Information 380-389 of a plurality of information may be associated to discrete amplitudes of an electromagnetic radiation wave n1 330-339 of a plurality of discrete amplitudes of an electromagnetic radiation wave n1, on a one to one relationship as demonstrated by information 380 the number "1", encoded as discrete amplitude of an electromagnetic radiation wave n1 330; information 381 a quantum state, encoded as discrete amplitude of an electromagnetic radiation wave n1 331; information 382 the character "A", encoded as discrete amplitude of an electromagnetic radiation wave n1 332; information 383 the character ".COPYRGT.", encoded as discrete amplitude of an electromagnetic radiation wave n1 333; information 384 the Russian character "", encoded as discrete amplitude of an electromagnetic radiation wave n1 334; information 385 the symbol "", encoded as discrete amplitude of an electromagnetic radiation wave n1 335; information 386 the word "Pizza", encoded as discrete amplitude of an electromagnetic radiation wave n1 336; information 387 the phrase "the sun has risen", encoded as discrete amplitude of an electromagnetic radiation wave n1 337, information 388 the concept "democracy", encoded as discrete amplitude of an electromagnetic radiation wave n1 338, information 389 the image "a cat", encoded as discrete amplitude of an electromagnetic radiation wave n1 339.

Encoding table 116C comprising discrete amplitudes of an electromagnetic radiation wave n1 330-339 of a plurality of discrete amplitudes of an electromagnetic radiation wave n1 and information 380-339 of a plurality of information have been illustrated for simplicity. In practice, there may be more or less discrete amplitudes of an electromagnetic radiation wave n1 330-339 of a plurality of discrete amplitudes of an electromagnetic radiation wave n1, and information 380-389 of a plurality of information. There may be no limit on how many times a unique piece of information may appear as information 380-389 of a plurality of information, in a table 116C. As example an alphabet character "S" may appear once or more than once as information in a table 116C, or not at all. In some cases association to a letter "S" by an discrete amplitude of an electromagnetic radiation wave n1 330-339 of a plurality of discrete amplitudes of an electromagnetic radiation wave n1, in a table 116C, may occur more than once with each unique letter "S" having a unique discrete amplitude of an electromagnetic wave n1 330-339 associated to it.

FIG. 12 illustrates an encoding table 116D. Encoding table 116D may comprise electromagnetic radiation wave frequencies 400-412 of a plurality of electromagnetic radiation wave frequencies and amplitudes 420-424 of a plurality of amplitudes of the electromagnetic radiation waves generating electromagnetic radiation wave frequencies 400-412, and encoded information 118D of a plurality of encoded information 118D. Encoded information 118D may comprise information 431-495 of a plurality of information. Encoded information 118D of a plurality of encoded information, information 431-495 of a plurality of information, may comprise individual characters, combinations of characters, alphabet, numeric, ASCII, UTF, Unicode, dictionary, glossary, lexicon, glyphs, symbols, words, sentences, phrases, ideas, pictographs, pictograms, ideograms, images, sounds, speech, gestures, physical objects, light, electronic signals, thoughts, ideas, algorithms, codes, software, formulas, video, cloud data, holographic data, data or combinations of information. A Encoding table 116D may be organized with rows and columns containing electromagnetic radiation wave frequencies 400-412 of a plurality of electromagnetic radiation wave frequencies and amplitudes 420-424 of a plurality of amplitudes of the electromagnetic radiation waves generating electromagnetic radiation wave frequencies 400-412 and information 431-495 of a plurality of information. Information 431 may be associated to an electromagnetic wave frequency 400 and at the same time an amplitude 420. A similar relationship may exist for each of information 431-495 in relation to electromagnetic wave frequencies 400-412 and amplitudes 420-424.

Encoding table 116D comprising electromagnetic radiation wave frequencies 400-412 and amplitudes 420-424 and information 431-495 has been illustrated for simplicity. In practice, there may be more or less electromagnetic radiation wave frequencies 400-412 and amplitudes 420-424 and information 431-495. There may be no limit on how many times a unique piece of information may appear as information 431-499 of a plurality of information, in a table 116D. As further example an alphabet character "G" may appear once or more than once as information in a table 116D, or not at all. In some cases association to a letter "G" by an electromagnetic radiation wave frequency 400-412 and amplitude 420-424 combination in a table 116D may occur more than once with each unique letter "G" having a unique electromagnetic radiation wave frequencies 400-412 and amplitudes 420-424 combination associated to it.

Encoding table 116A, 116B, 116C, 116D, or the like have been illustrated for simplicity. In practice they may be organized differently and based upon a database, file system or other data storage means that may contain one or more of encoding table 116, 116A, 116B, 116C, 116D, or the like, or the information contained in those tables. Database, file system and data storage means are well known to those familiar in the art of data management and storage and is not discussed here.

Exemplary Processing

Figure 13:
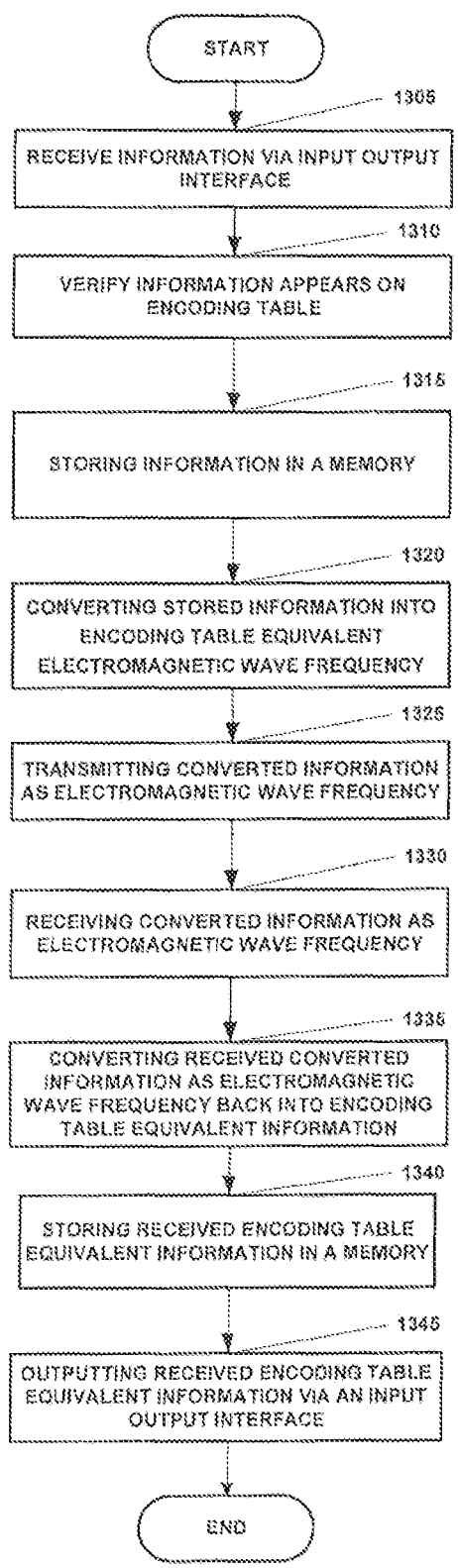
FIG. 13 illustrates an exemplary process for converting information to electromagnetic radiation frequencies, consistent with the present invention.

FIG. 13 illustrates an exemplary process, consistent with the present invention, for encoding information 900 into electromagnetic radiation, transmitting the encoded electromagnetic radiation, decoding received electromagnetic radiation back into information 900.

In an implementation consistent with the present invention, encoder transmitter 110 connected to a decoder receiver 120, via a network 140, may perform this process.

Processing may begin with a encoder transmitter 110 receiving [act 1305] information 900 via input output interface 119.

Received information 900 may be verified [act 1310] by processor 117, that it appears in encoding table 116A. Received information 900 may be stored [act 1315] in memory 115. Any new information 900 that does not appear as encoded information 118A in a encoding table 116A may be added to an encoding table 116A. The adding process may be a write process which is well know to those familiar with the art of data management and storage and not discussed here.

Electromagnetic radiation wave transmitter 112 may process each piece of information 900 stored in a memory 115, converting [act 1320] each piece of information 900, according to encoding table 116A as illustrated previously in FIG. 9, to ifs encoded electromagnetic radiation wave frequencies 310-319 equivalent and transmitting [act 1325] the encoded electromagnetic radiation wave frequencies 310-319 from encoder transmitter 110 via a network 140 to decoder receiver 120.

Decoder receiver 120 may comprise electromagnetic radiation wave detector 122 that may comprise an encoding table 116A. Decoder receiver 120 that may comprise electromagnetic radiation wave detector 122 may receive [act 1330] transmitted electromagnetic radiation wave frequencies 310-319 via a network 140. Electromagnetic radiation wave detector 122 may compare the received electromagnetic radiation wave frequencies 310-319 against encoding table 116A and may convert [act 1335] received electromagnetic radiation wave frequencies 310-319 according to the encoding table 116A, into received information 900. Received information 900 may be stored [act 1340] in memory 125. Received information 900 may be processed through processor 127 and output [act 1345] via input output interface 129 to outside of the system.

Figure 14:
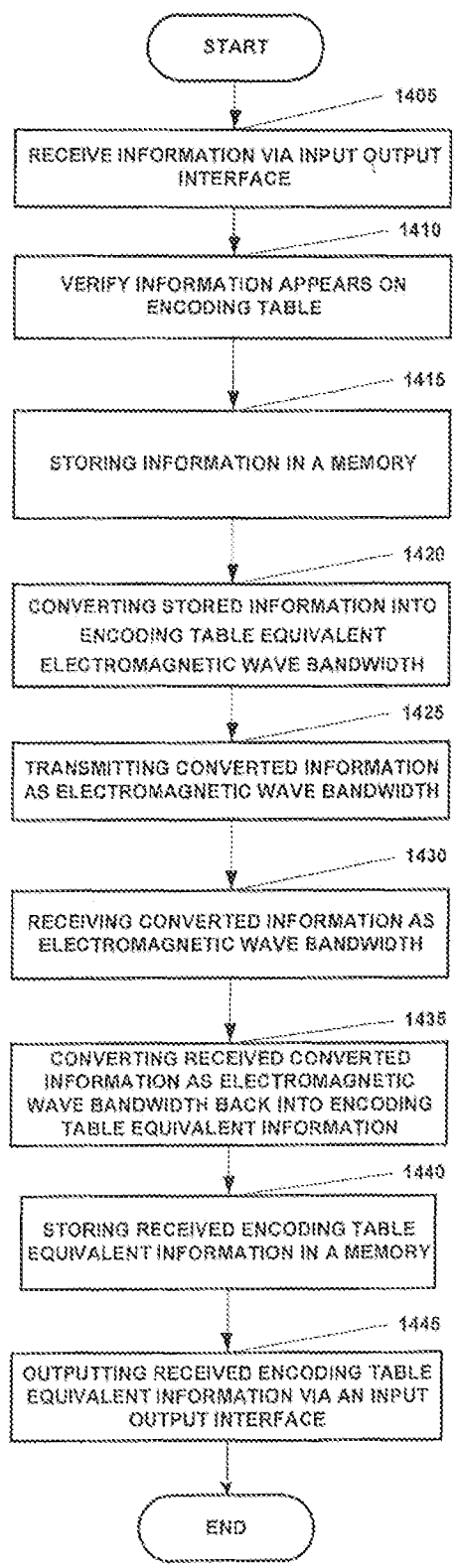
FIG. 14 illustrates an exemplary process for converting information to electromagnetic radiation bandwidths, consistent with the present invention.

FIG. 14 illustrates an exemplary process of another implementation consistent with the present invention, for encoding information 900 into electromagnetic radiation, transmitting the encoded electromagnetic radiation, decoding received electromagnetic radiation back into information 900.

Processing may begin with a encoder transmitter 110 receiving [act 1405] information 900 via input output interface 119.

Received information 900 may be verified [act 1410] by processor 117, that it appears in encoding table 116B. Received information 900 may be stored [act 1415] in memory 115. Any new information 900 that does not appear as encoded information 118B in a encoding table 116B, may be added to an encoding table 116B. The adding process may be a write process which is well know to those familiar with art of data management and storage and not discussed here.

Electromagnetic radiation wave transmitter 112 may process each piece of information 900 stored in a memory 115, converting [act 1420] each piece of information 900 according to encoding table 116B as illustrated previously in FIG. 10, to it's encoded electromagnetic radiation wave bandwidth 320-329 equivalent and transmitting [act 1425] the encoded electromagnetic radiation width bandwidth 320-329 from encoder transmitter 110 via a network 140 to decoder receiver 120.

Decoder receiver 120 may comprise electromagnetic radiation wave detector 122 that may comprise an encoding table 116B. Decoder receiver 120 that may comprise electromagnetic radiation wave detector 122 may receive [act 1430] transmitted electromagnetic radiation bandwidths 320-329 via a network 140. Electromagnetic radiation wave detector 122 may compare the received electromagnetic radiation bandwidths 320-329 against encoding table 116B. Electromagnetic radiation wave detector 122 may convert [act 1435] received electromagnetic radiation bandwidths 320-329 according to the encoding table 116B, into received information 900. Received information 900 may be stored [act 1440] in memory 125. Received information 900 may be processed through processor 127 and output [act 1445] via input output interface 129 to outside of the system.

Figure 15:
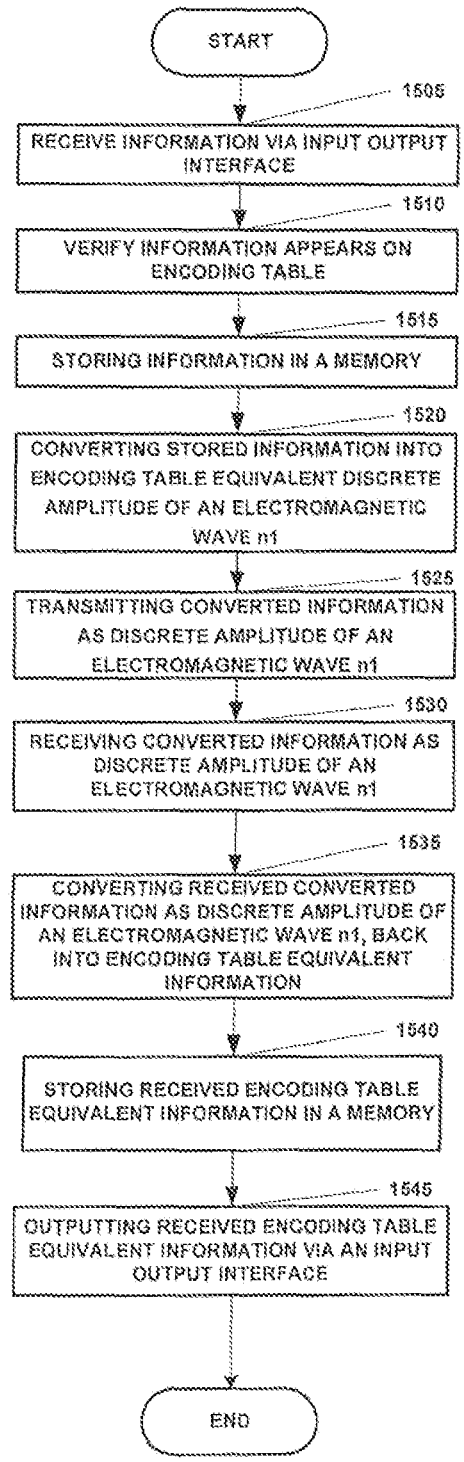
FIG. 15 illustrates an exemplary process for converting information to electromagnetic radiation amplitudes, consistent with the present invention.

FIG. 15 illustrates an exemplary process of another implementation consistent with the present invention, for encoding information 900 into electromagnetic radiation, transmitting the encoded electromagnetic radiation, decoding received electromagnetic radiation back into information 900.

Processing may begin with a encoder transmitter 110 receiving [act 1505] information 900 via input output interface 119.

Received information 900 may be verified [act 1510] by processor 117, that it appears in encoding table 116C. Received information 900 may be stored [act 1515] in memory 115. Any new information 900 that does not appear as encoded information 118C in a encoding table 116C, may be added to an encoding table 116C. The adding process may be a write process which is well know to those familiar with art of data management and storage and not discussed here.

Electromagnetic radiation wave transmitter 112 may process each piece of information 900 stored in a memory 115, converting [act 1520] each piece of information 900 according to encoding table 116C as illustrated previously in FIG. 11, to it's encoded discrete amplitudes of an electromagnetic radiation wave n1 330-339 equivalent and transmitting [act 1525] the encoded discrete amplitudes of an electromagnetic radiation wave n1 330-339 from encoder transmitter 110 via a network 140 to decoder receiver 120.

Decoder receiver 120 may comprise electromagnetic radiation wave detector 122 which may receive [act 1530] transmitted discrete amplitudes of an electromagnetic radiation wave n1 330-339 via a network 140. Electromagnetic radiation wave detector 122 may compare the received discrete amplitudes of an electromagnetic radiation wave n1 330-339 against encoding table 116C. Electromagnetic radiation wave detector 122 may convert [act 1535] received discrete amplitudes of an electromagnetic radiation wave n1 330-339 according to the encoding table 116C, into received information 900. Received information 900 may be stored [act 1540] in memory 125. Received information 900 may be processed through processor 127 and output [act 1545] via input output interface 129 to outside of the system.

Figure 16:
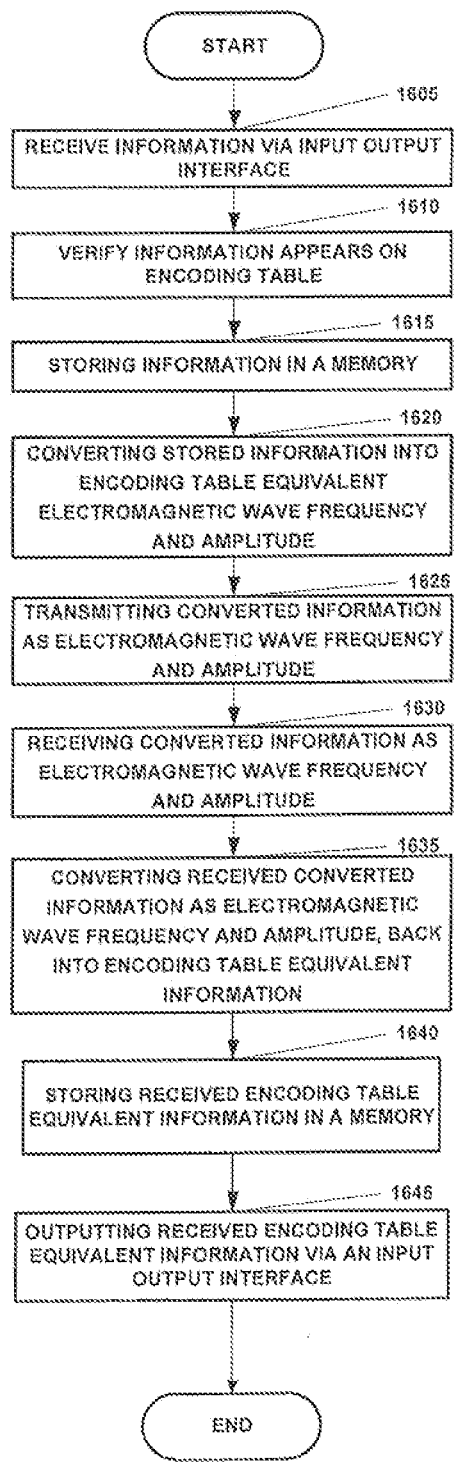
FIG. 16 illustrates an exemplary process for converting information to electromagnetic radiation frequencies and amplitudes, consistent with the present invention.

FIG. 16 illustrates an exemplary process of another implementation consistent with the present invention, for encoding information 900 into electromagnetic radiation, transmitting the encoded electromagnetic radiation, decoding received electromagnetic radiation back into information 900.

Processing may begin with a encoder transmitter 110 receiving [act 1605] information 900 via input output interface 119.

Received information 900 may be verified [act 1610] by processor 117, that it appears in encoding table 116D. Received information 900 may be stored [act 1615] in memory 115. Any new information 900 that does not appear as encoded information 118D in a encoding table 116D, may be added to an encoding table 116D. The adding process may be a write process which is well know to those familiar with art of data management and storage and not discussed here.

Electromagnetic radiation wave transmitter 112 may process each piece of information 900 stored in a memory 115, converting [act 1620] each piece of information 900 according to encoding table 116D as illustrated previously in FIG. 12, to it's encoded electromagnetic radiation wave frequency 400-412 and amplitude 420-424 equivalent and transmitting [act 1625] the encoded electromagnetic radiation wave frequency 400-412 and amplitude 420-424 equivalent from encoder transmitter 110 via a network 140 to decoder receiver 120.

Decoder receiver 120 may comprise electromagnetic radiation wave detector 122 which may receive [act 1630] transmitted electromagnetic radiation wave frequency 400-412 and amplitude 420-424 equivalent via a network 140. Electromagnetic radiation wave detector 122 may compare the received electromagnetic radiation wave frequency 400-412 and amplitude 420-424 equivalent against encoding table 116D. Electromagnetic radiation wave detector 122 may convert [act 1635] received electromagnetic radiation wave frequency 400-412 and amplitude 420-424 equivalent according to the encoding table 116D, into received information 900. Received information 900 may be stored [act 1640] in memory 125. Received information 900 may be processed through processor 127 and output [act 1645] via input output interface 129 to outside of the system.

In another implementation consistent with the present invention, information 900 produced by a decoder receiver 120 need not be exactly the same as the original information 900 transmitted by an encoder transmitter 110, but only needs be an accurate representation of it. As example it might be sufficient that audio speech that is converted to electromagnetic radiation wave frequencies of 310-319, electromagnetic radiation bandwidth 320-329, discrete amplitudes of an electromagnetic radiation wave n1 330-339 or combination thereof and transmitted to a decoder receiver 120, be decoded as a text string representation of the audio speech, rather than the original audio speech.

In another implementation consistent with the present invention, information 900 to be converted to electromagnetic radiation wave frequencies of 310-319, electromagnetic radiation bandwidth 320-329, discrete amplitudes of an electromagnetic radiation wave n1 330-339 or combination thereof may be in electronic form—either natively (an EKG signal) or having been converted to electronic format e.g. such as speech being converted to an analog or digital signal through speech recognition, or human speech being recorded into a digital signal format, or a gesture being converted into an electronic signal, a thought converted to a electronic signal.

In another implementation consistent with the present invention, multiple pieces of information 900 may be converted to one or more of electromagnetic radiation wave frequencies 310-319 and may be multiplexed and transmitted by an encoder transmitter 110. The multiplexed signals may be de-multiplexed and then decoded by a decoder receiver 120 when received, back into information 900.

In another implementation consistent with the present invention, multiple pieces of information 900 may be converted to one or more of electromagnetic radiation bandwidths 320-329 and may be multiplexed and transmitted by an encoder transmitter 110. The multiplexed signals may be de-multiplexed and then decoded by a decoder receiver 120 when received, back into information 900.

In another implementation consistent with the present invention, one or more pieces of information 900 may be converted to one or more of discrete amplitudes of an electromagnetic radiation wave n1 330-339 and may be multiplexed and transmitted by an encoder transmitter 110. The multiplexed signals may be de-multiplexed and then decoded by a decoder receiver 120 when received, back into information 900.

In another implementation consistent with the present invention, an encoder transmitter 110, a decoder receiver 120, or a encoder transmitter decoder receiver device 210 may comprise multiple encoding tables 116 in each device for encoding and decoding information 900. The only requirement would be that transmitting and receiving devices need to synchronize to each other to use the same encoding tables 116 for encoding and decoding the information 900. Synchronization may be achieved by an encoder transmitter 110 sending pre-set synchronization signal electromagnetic radiation wave frequencies of 310-319, electromagnetic radiation bandwidth 320-329, discrete amplitudes of an electromagnetic radiation wave n1 330-339 or combination thereof to a decoder receiver 120. Pre-set synchronization signal electromagnetic radiation wave frequencies of 310-319, electromagnetic radiation bandwidth 320-329, discrete amplitudes of an electromagnetic radiation wave n1 330-339 or combination thereof may be included in one or more encoding tables 116. A pre-set synchronization signal may be a signal to a decoder receiver 120 telling it which of encoding tables 116, may be used for decoding the electromagnetic radiation wave frequencies of 310-319, electromagnetic radiation bandwidth 320-329, discrete amplitudes of an electromagnetic radiation wave n1 330-339 or combination thereof being transmitted.

In another implementation consistent with the present invention, one or more destination address signals may be used to direct a grouping of one or more electromagnetic radiation wave frequencies 310-319, electromagnetic radiation bandwidths 320-329, or discrete amplitudes of an electromagnetic radiation wave n1 330-339 to a destination location. Encoded information 118 may be sandwiched between a header destination address signal and an ending destination address signal. A header destination address signal may be included in one or more encoding tables 116. A ending destination address signal may be included in one or more encoding tables 116. A destination location sensing device may be placed at one or more critical locations in a network 140. A destination location sensing device may comprise one or more encoding tables 116. A destination address sensing device may sense a header destination address signal passing through it and may redirect header destination address signal towards the encoded destination along with all electromagnetic radiation wave frequencies 310-319, electromagnetic radiation bandwidths 320-329, or discrete amplitudes of an electromagnetic radiation wave n1 330-339 following the header destination address signal, till an ending destination address signal is sensed telling all destination location sensing devices it may pass through, along network 140, that the end of a transmission to an address location has occurred.

In another implementation consistent with the present invention, electromagnetic radiation wave frequencies 310-319, electromagnetic radiation bandwidths 320-329, discrete amplitudes of an electromagnetic radiation wave n1 330-339, or a combination thereof may be transmitted sequentially or in another order understandable to the system, to a destination location.

In another implementation consistent with the present invention, the transmission of signals from an encoder transmitter 110 to a decoder receiver 120 may be at a signal strength sufficient to be received by decoder receiver 120.

In another implementation consistent with the present invention, signals representing information 900 transmitted from an encoder transmitter 110 to a decoder receiver 120 may be separated from each other by timing the transmissions so each signal is uniquely identifiable by decoder receiver 120.

In another implementation consistent with the present invention, encoder transmitter 110. may be able to deduce from the context of how encoded information 118 is managed, organized and stored in a encoding table 116, how to correctly encode information 900.

In another implementation consistent with the present invention, decoder receiver 120 may be able to deduce from the context of how encoded information 118 is managed, organized and stored in a encoding table 116, how to correctly decode encoded information 118 into information 900.

In another implementation consistent with the present invention, two or more electromagnetic radiation wave frequencies 310-319 may need to be transmitted in order to represent a single information 360-369. Encoding tables 116 shall be organized to support method.

In another implementation consistent with the present invention, two or more electromagnetic radiation wave bandwidths 320-329 may need to be transmitted in order to represent a single information 370-379. Encoding tables 116 shall be organized to support method.

In another implementation consistent with the present invention, two or more electromagnetic radiation wave amplitudes 330-339 may need to be transmitted in order to represent a single information 380-389. Encoding tables 116 shall be organized to support method.

In another implementation consistent with the present invention, two or more electromagnetic radiation wave frequencies 400-412 and amplitudes 420-424 may need to be transmitted in order to represent a single information 431-495. Encoding tables 116 shall be organized to support method.

In another implementation consistent with the present invention, one or more electromagnetic radiation wave frequencies 310-319, electromagnetic radiation wave bandwidths 320-329, electromagnetic radiation wave amplitudes 330-339 may be utilized as a shift bit to toggle: which associations in an encoding able 116 are assigned to information 118. Encoding tables 116 may be constructed to support this method.

CONCLUSION

A high speed information transfer method and system.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. No element, act, or instruction used in the description of the present application should be construed as critical or essential to the invention unless explicitly described as such.

The scope of the invention is defined by the following claims and their equivalents.

We claim:

1. A high speed information transfer system comprising:
   an encoder transmitter of a plurality of encoder transmitter apparatuses configured to communicate via a network of a plurality of networks with a decoder receiver of a plurality of decoder receiver apparatuses;
   a) the encoder transmitter comprising:
      i) a first input output interface;
      ii) an electromagnetic radiation wave transmitter configured to transmit electromagnetic radiation; and
      iii) a first memory configured for storing signals as directed by a first processor;
   b) an encoding database comprising:
      i) a set of encoding information;
      ii) a listing of electromagnetic radiation spectrums of a plurality of electromagnetic radiation spectrums; and
      iii) associations between the set of encoding information and the listing of electromagnetic radiation spectrums of the plurality of electromagnetic radiation spectrums; and
   c) the decoder receiver comprising:
      i) a second input output interface;
      ii) an electromagnetic radiation wave detector configured to detect the electromagnetic radiation; and
      iii) a second memory configured for storing signals as directed by a second processor;
   wherein:
   A) the encoder transmitter is configured to:
      1) receive a set of input information via the first input output interface;
      2) convert the set of input information according to the associations between the set of encoding information and the listing of electromagnetic radiation spectrums of the plurality of electromagnetic radiation spectrums in the encoding database, to encoded electromagnetic radiation; and
      3) transmit, via the electromagnetic radiation wave transmitter, the encoded electromagnetic radiation to the decoder receiver; and
   B) the decoder receiver is configured to:
      1) receive the encoded electromagnetic radiation;
      2) convert the encoded electromagnetic radiation according to the associations between the set of encoding information and the listing of electromagnetic radiation spectrums of the plurality of electromagnetic radiation spectrums in the encoding database, to a set of decoded information; and
      3) output the set of decoded information via the second input output interface.

2. The system of claim 1, wherein the set of input information comprises one or more of alphabet characters, numeric characters, ASCII characters, Unicode characters, characters, words, sentences, phrases, cloud data, documents, images, symbols, ideograms, dictionaries, glossaries, pictograms, user defined representations, quantum states, thoughts converted to electronic signals, sounds, glyphs, speech, lexicons, gestures, holographic data, video, electromagnetic radiation, electronic signals, algorithms, codes, software, formulas, or data.

3. The system of claim 1, wherein the set of decoded information comprises one or more of alphabet characters, numeric characters, ASCII characters, Unicode characters, characters, words, sentences, phrases, cloud data, documents, images, symbols, ideograms, dictionaries, glossaries, pictograms, user defined representations, quantum states, thoughts converted to electronic signals, sounds, glyphs, speech, lexicons, gestures, holographic data, video, electromagnetic radiation, electronic signals, algorithms, codes, software, formulas, or data.

4. The system of claim 1, wherein the encoder transmitter comprises components that are one or more of update-able, modify-able, replace-able, retrieve-able, delete-able.

5. The system of claim 1, wherein the decoder receiver comprises components that are one or more of update-able, modify-able, replace-able, retrieve-able, delete-able.

6. The system of claim 1, wherein the set of input information is verified by the first processor that it appears in the encoding database.

7. The system of claim 1, wherein the set of input information does not appear in the encoding database and is written to the encoding database.

8. The system of claim 1, wherein the form of the decoded information produced by the decoder receiver is different than the form of the set of input information transmitted by the encoder transmitter.

9. The system of claim 1, wherein one or more destination signals may be used to direct a grouping of one or more electromagnetic radiation wave frequencies, electromagnetic radiation bandwidths, or discrete amplitudes of an electromagnetic radiation wave to a destination location.

10. The system of claim 1, wherein two or more electromagnetic radiation wave frequencies, electromagnetic radiation bandwidths, or discrete amplitudes of an electromagnetic radiation wave are used to represent a piece of received information.

11. The system of claim 1, wherein the listing of electromagnetic radiation spectrums of the plurality of electromagnetic radiation spectrums is one or more of a plurality of electromagnetic radiation frequencies, a plurality of electromagnetic radiation bandwidths, a plurality of electromagnetic radiation amplitudes, or a plurality of electromagnetic radiation frequencies and amplitudes.

12. The system of claim 1, wherein the network comprises one or more of:
  a) a local area network;
  b) a wide area network;
  c) a telephone network;
  d) a satellite network;
  e) a wireless network;
  f) an optical network;
  g) a mobile phone network;
  h) an open space network; and
  i) an electromagnetic wave network.

13. The system of claim 1, wherein the encoding database comprises two or more distributed databases, and wherein a first database of the two or more distributed databases comprises a first set of data, and a second database of the two or more distributed databases comprises a second set of data.

14. A high speed information transfer system comprising:
  an encoding database comprising:
    i) a set of encoding information;
    ii) a listing of electromagnetic radiation spectrums of a plurality of electromagnetic radiation spectrums; and
    iii) associations between the set of encoding information and the listing of electromagnetic radiation spectrums of the plurality of electromagnetic radiation spectrums; and
  two or more encoder transmitter decoder receivers, wherein each of the two or more encoder transmitter decoder receivers comprises:
    a) an encoder transmitter comprising:
      i) a first input output interface;
      ii) an electromagnetic radiation wave transmitter configured to transmit electromagnetic radiation; and
      iii) a first memory configured for storing signals as directed by a first processor; and
    b) a decoder receiver comprising:
      i) a second input output interface;
      ii) an electromagnetic radiation wave detector configured to detect the electromagnetic radiation; and
      iii) a second memory configured for storing signals as directed by a second processor;
  wherein:
  I.) a first encoder transmitter decoder receiver of the two or more encoder transmitter decoder receivers is configured to execute a set of encoding instructions on the first processor of the first encoder transmitter decoder receiver, and a second encoder transmitter decoder receiver of the two or more encoder transmitter decoder receivers is configured to execute a set of decoding instructions on the second processor of the second encoder transmitter decoder receiver;
  II.) the second encoder transmitter decoder receiver is configured to execute the set of encoding instructions on the first processor of the second encoder transmitter decoder receiver, and the first encoder transmitter decoder receiver is configured to execute the set of decoding instructions on the second processor of the first encoder transmitter decoder receiver;
  and wherein:
  A.) the set of encoding instructions comprises instructions that can be executed to:
    i.) enable one or more of, one way, bi-directional or multi-directional communication between two or more encoder transmitter decoder receivers;
    ii.) receive a set of input information;
    iii.) convert the set of input information according to the associations between the set of encoding information and the listing of electromagnetic radiation spectrums of the plurality of electromagnetic radiation spectrums in the encoding database, to a set of encoded electromagnetic radiation;
    iv.) transmit the encoded electromagnetic radiation to the decoder receiver; and
  B.) the set of decoding instructions comprises instructions that can be executed to:
    i.) enable one or more of, one way, bi-directional or multi-directional communication between two or more encoder transmitter decoder receivers;
    ii.) receive the encoded electromagnetic radiation;
    iii.) convert the encoded electromagnetic radiation according to the associations between the set of encoding information and the listing of electromagnetic radiation spectrums of the plurality of electromagnetic radiation spectrums in the encoding database, to a set of decoded information;
    iv.) output the set of decoded information.

15. The system of claim 14, wherein the set of input information comprises one or more of, alphabet characters, numeric characters, ASCII characters, Unicode characters, characters, words, sentences, phrases, cloud data, documents, images, symbols, ideograms, dictionaries, glossaries, pictograms, user defined representations, quantum states, thoughts converted to electronic signals, sounds, glyphs, speech, lexicons, gestures, holographic data, video, electromagnetic radiation, electronic signals, algorithms, codes, software, formulas, or data.

16. The system of claim 14, wherein the set of decoded information comprises one or more of, alphabet characters, numeric characters, ASCII characters, Unicode characters, characters, words, sentences, phrases, cloud data, documents, images, ideas, symbols, ideograms, dictionaries, glossaries, pictograms, user defined representations, quantum states, thoughts converted to electronic signals, sounds, glyphs, speech, lexicons, gestures, holographic data, video, electromagnetic radiation, electronic signals, algorithms, codes, software, formulas, or data.

17. The system of claim 14, wherein the first encoder transmitter decoder receiver comprises components that are one or more of update-able, modify-able, replace-able, retrieve-able, and delete-able.

18. The system of claim 14, wherein the set of input information is verified by a processor that it appears in the encoding database.

19. The system of claim 14, wherein the set of input information does not appear in the encoding database and is written to the encoding database.

20. The system of claim 14, wherein the form of the set of decoded information produced by one or more encoder transmitter decoder receivers is different than the form of the set of input information transmitted by one or more encoder transmitter decoder receivers.

21. The system of claim 14, wherein one or more destination signals may be used to direct a grouping of one or more electromagnetic radiation wave frequencies, electromagnetic radiation bandwidths, or discrete amplitudes of an electromagnetic radiation wave to a destination location.

22. The system of claim 14, wherein two or more electromagnetic radiation wave frequencies, electromagnetic radiation bandwidths, or discrete amplitudes of an electromagnetic radiation wave are used to represent a piece of received information.

23. The system of claim 14, wherein the listing of electromagnetic radiation spectrums of the plurality of electromagnetic radiation spectrums is one or more of a plurality of electromagnetic radiation frequencies, a plurality of electromagnetic radiation bandwidths, a plurality of electromagnetic radiation amplitudes, or a plurality of electromagnetic radiation frequencies and amplitudes.

24. The system of claim 14, wherein the encoding database comprises two or more distributed databases, and wherein a first database of the two or more distributed databases comprises a first set of data, and a second database of the two or more distributed databases comprises a second set of data.

* * * * *

UNITED STATES PATENT AND TRADEMARK OFFICE
CERTIFICATE OF CORRECTION

PATENT NO. : 9,490,903 B2
APPLICATION NO. : 14/729690
DATED : November 8, 2016
INVENTOR(S) : Stuart E. Goller et al.

Page 1 of 1

It is certified that error appears in the above-identified patent and that said Letters Patent is hereby corrected as shown below:

In the Specification

Column 3, Lines 40-42, read "... alternate network 102 in which a system and method, consistent with the present invention, may be implemented. A alternate network 102 ..."; which should he deleted and replaced with "...alternate network 101 in which a system and method, consistent with the present invention, may be implemented. An alternate network 101 ...."

Column 13, Line 22, reads "... encoder transmitter 110. may be able to deduce..."; which should be deleted and replaced with "... encoder transmitter 110 may be able to deduce ...."

Signed and Sealed this
Fourteenth Day of February, 2017

Michelle K. Lee
*Director of the United States Patent and Trademark Office*